United States Patent [19]
Godin

[11] Patent Number: 4,941,672
[45] Date of Patent: Jul. 17, 1990

[54] REAR WHEEL STEERING DRIVE MECHANISM

[75] Inventor: Lawrence J. Godin, West Bloomfield, Mich.

[73] Assignee: Chrysler Corporation, Highland Park, Mich.

[21] Appl. No.: 348,436

[22] Filed: May 8, 1989

[51] Int. Cl.[5] .............................................. B62D 7/15
[52] U.S. Cl. ........................................ 280/91; 74/497
[58] Field of Search ...................... 280/91, 99; 74/497, 74/110

[56] References Cited

U.S. PATENT DOCUMENTS

| | | | |
|---|---|---|---|
| 1,439,463 | 12/1922 | Zaparka | 74/497 |
| 1,791,025 | 2/1931 | Hague | 74/497 |
| 2,319,880 | 5/1943 | Pulleyblank | 280/91 |

FOREIGN PATENT DOCUMENTS

| | | | |
|---|---|---|---|
| 867611 | 11/1941 | France | 74/497 |
| 287677 | 11/1988 | Japan | 280/91 |
| 78978 | 3/1989 | Japan | 280/91 |
| 2067 | of 1914 | United Kingdom | 74/497 |

Primary Examiner—Charles A. Marmor
Assistant Examiner—Karin Tyson
Attorney, Agent, or Firm—Edward A. Craig

[57] ABSTRACT

A rear wheel steering driving mechanism is provided for a vehicle having a front wheel steering system and a rear wheel steering system. The drive mechanism includes an input shaft adapted to be operatively connected to the front wheel steering system for rotation thereby whenever the front wheel steering system is activated and an output shaft adapted to be operably connected to the rear wheel steering system to selectively transmit front wheel steering system activity to the rear wheel system.

5 Claims, 4 Drawing Sheets

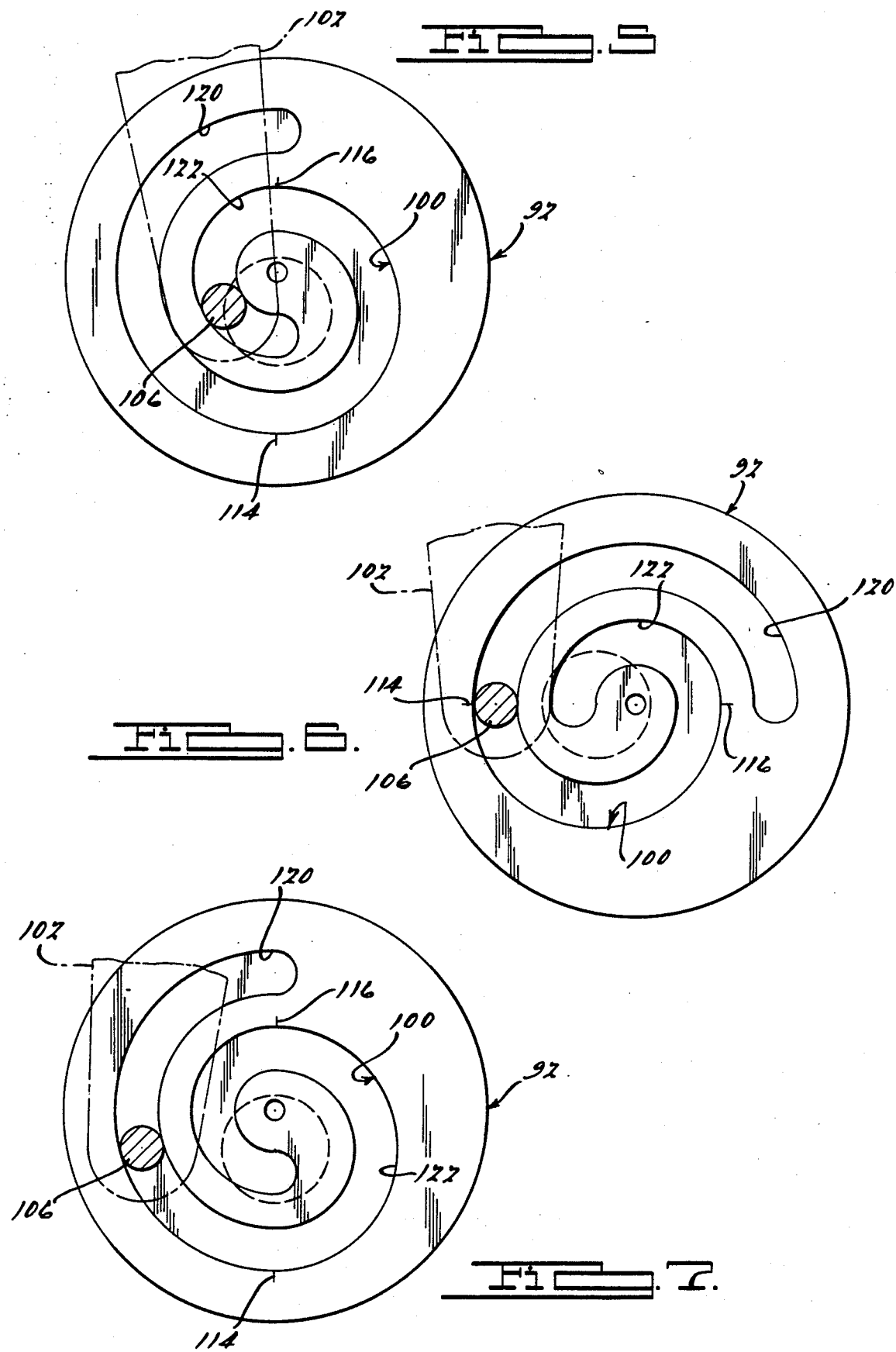

4,941,672

REAR WHEEL STEERING DRIVE MECHANISM

BACKGROUND OF THE INVENTION

1. Field of the Invention

The present invention relates to a vehicle steering device in which both the front wheels and the rear wheels are steered.

2. Description of the Prior Art

In the past, four-wheeled vehicles, such as automobiles and trucks, have conventionally been steered by manipulation of the front wheels only. Front wheel steering has proved to be satisfactory for operation of most vehicles, particularly smaller wheelbase vehicles such as automobiles. Steering of both the front and rear wheels has not been considered particularly useful for most straight ahead driving situations.

However, it would be desirable in longer wheelbase vehicles, such as large vans, to steer the rear wheels under certain conditions. For example, if the rear wheels can be steered when turning around a corner, making a U-turn, and other similar situations, the turning radius is desirably reduced to facilitate improved handling of such vehicles in situations where turning space is limited.

In accordance with the present invention, a rear wheel steering drive mechanism is provided wherein the steering action for the rear wheels does not come into play until after the front wheels have been turned through a preliminary angle. The rear wheels are only steered after the front wheels have been turned beyond an angle which represents a severe turn of the vehicle such as will occur when making a U-turn or going around a corner. In straight ahead driving, the rear wheels are not steered during small steering manipulations of the front wheels which normally occur during the course of such straight ahead driving. U. S. Pat. No. 4,813,694, issued Mar. 21, 1989, illustrates a cam actuated mechanism suitable for this purpose. The present invention relates to a simplified cam operated mechanism.

SUMMARY OF THE INVENTION

A rear wheel steering drive mechanism for a vehicle having a front wheel steering system and a rear wheel steering system. The rear wheel steering drive mechanism comprises a casing having an input shaft and an output shaft journaled in the casing. The input shaft is adapted to be operatively connected to the front wheel steering system for rotation thereby whenever the front wheel steering system is activated. The output shaft is adapted to be operatively connected to the rear wheel steering system to selectively transmit front wheel steering system activity to the rear wheel steering system.

A cam member is positioned within the casing and is connected to the input shaft for rotation therewith. The cam member has a spiral cam groove. A cam arm is connected to the output shaft for rotation therewith. A cam pin extends from the cam arm into the cam groove.

The cam groove has a central circular first cam portion, the center of which is coincident with the axis of rotation of the cam member. The cam pin is positioned at substantially the mid-point of the first cam portion when the vehicle front wheel steering system is in the straight ahead mode whereby initial actuation of the front wheel steering system with concomitant turning of the input shaft and cam member is ineffective to cause movement of the cam arm so long as the cam pin is positioned within the first cam portion.

The cam groove has a second cam portion spiralling radially outwardly from one end of the first cam portion and a third cam portion spiralling radially inwardly from the other end of the first cam portion. Continued actuation of the front wheel steering system ultimately rotating the input shaft and cam member to a position where the cam pin enters one of the second or third cam portions depending upon the direction of front wheel steering with resultant pivoting of the cam arm and rotation of the output shaft and actuation of the rear wheel steering system.

The second and third cam portions are preferably circular and have a common center differing in location from that of the first cam portion. The first cam portion preferably extends over an arc of about 180 circular degrees. Each of the second and third cam portions preferably extend over an arc of about 180 circular degrees.

Preferably, the drive mechanism initiates rear wheel steering after the front wheel steering mechanism has progressed about 15 circular degrees in either direction and the drive mechanism actuates the rear wheel steering mechanism about 10 circular degrees in either direction.

BRIEF DESCRIPTION OF THE DRAWINGS

FIG. 5 is a view similar to FIG. 4 illustrating the cam pin after initial actuation of the rear wheel steering drive mechanism in the direction proposed in FIG. 4;

FIG. 6 is a view similar to FIG. 4 illustrating the cam pin in position to actuate the rear wheel steering drive mechanism in the opposite direction from that of FIG. 4; and FIG. 7 is a view illustrating the cam pin in a position after actuation of the rear wheel steering drive mechanism has been initiated in the direction proposed in FIG. 6.

DETAILED DESCRIPTION OF A PREFERRED EMBODIMENT

Figure 1:
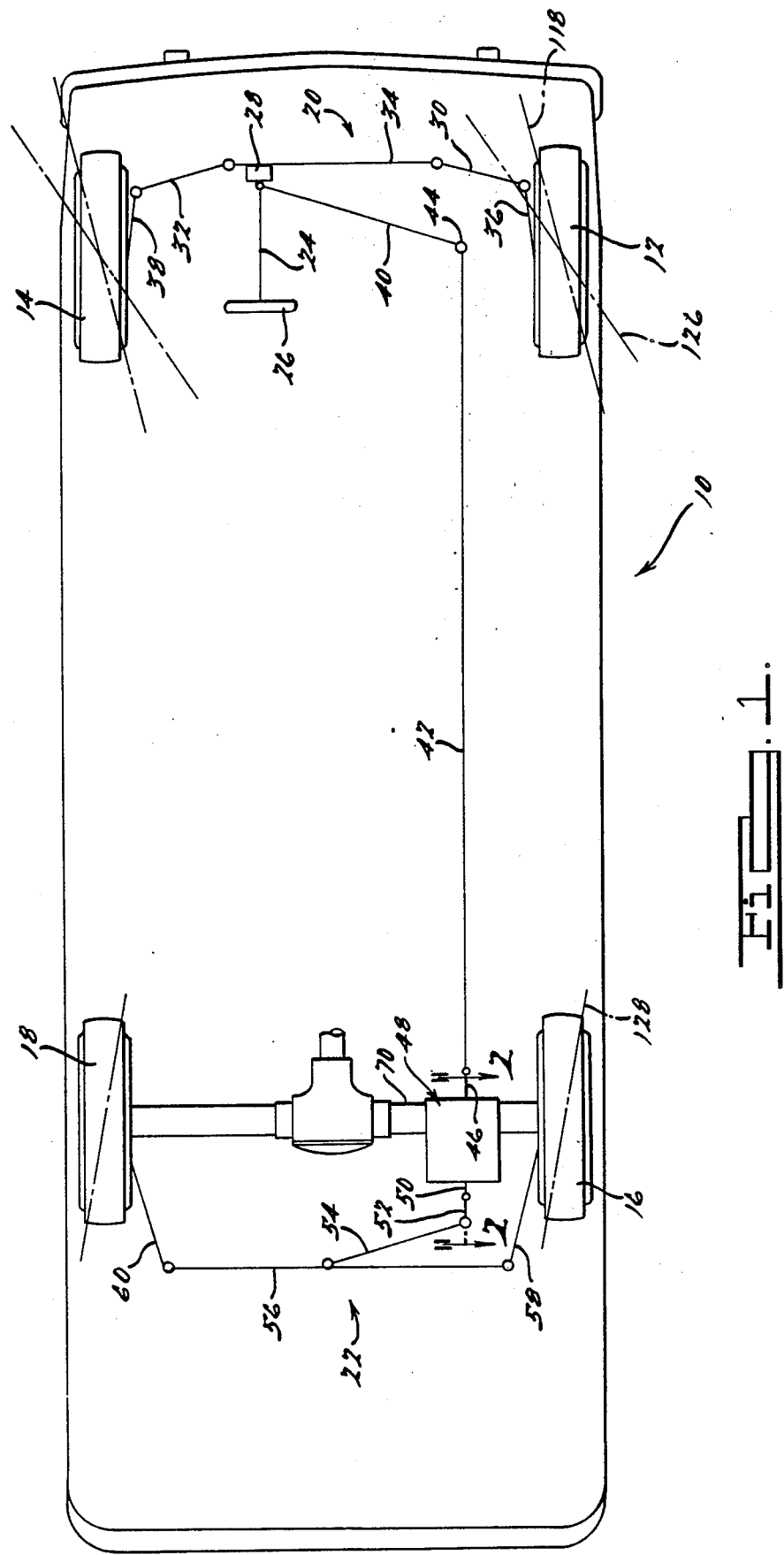
FIG. 1 is a diagrammatic plan view of a vehicle having a front wheel steering system and a rear wheel steering system with the rear wheel steering drive mechanism of the present invention interposed therebetween.

Referring first to FIG. 1, a vehicle 10 is diagrammatically illustrated. The vehicle 10 includes a pair of front wheels 12, 14 and a pair of rear wheels 16, 18. A conventional front wheel steering system 20 is provided for the front wheels and a conventional rear wheel steering system 22 is provided for the rear wheels. A steering column 24, carrying a steering wheel 26, is provided for manual steering by the driver of the vehicle. The steering column 24 is connected to a direction changing means installed in a gear box 28. Rotation of the steering column 24 is transformed to right or left turning of the front wheels 12, 14 by means of tie rods 30, 32 which are connected to a connecting rod 34 under, for example, a rack-and-pinion type of direction changing means. The tie rods are connected to the arms of steering knuckles 36, 38 which support the front wheels 12, 14. The steering action may be assisted as is usual by power steering structure provided in the gear box 28.

A connecting shaft 40 is connected internally to a mechanism in the gear box 28 through an operating force transmitting means such as a rack-and-pinion, bevel gear, worm gear or the like. An operating shaft 42 is connected to the connecting shaft 40 by means of a universal joint 44. The operating shaft 42 extends rearwardly of the vehicle 10 and is connected to the input shaft 46 of the rear wheel steering drive mechanism 48 of the present invention. The mechanism 48 has an output shaft 50 which is connected to a pitman arm 52 by means of a nut 53 and washer 55. The pitman arm 52 is connected to a drag link 54 which, in turn, is connected to a tie rod 56. The tie rod 56 is connected to the arms of steering knuckles 58, 60 which may be steered to the right or the left as described in connection with the front wheel steering system. The front and rear wheel steering systems 20, 22 used in the present invention are conventional. Operative examples thereof are disclosed in U. S. Pat. Nos. 4,557,493, issued Dec. 10, 1985 and 4,691,932, issued Sept. 8, 1987.

Figure 2:
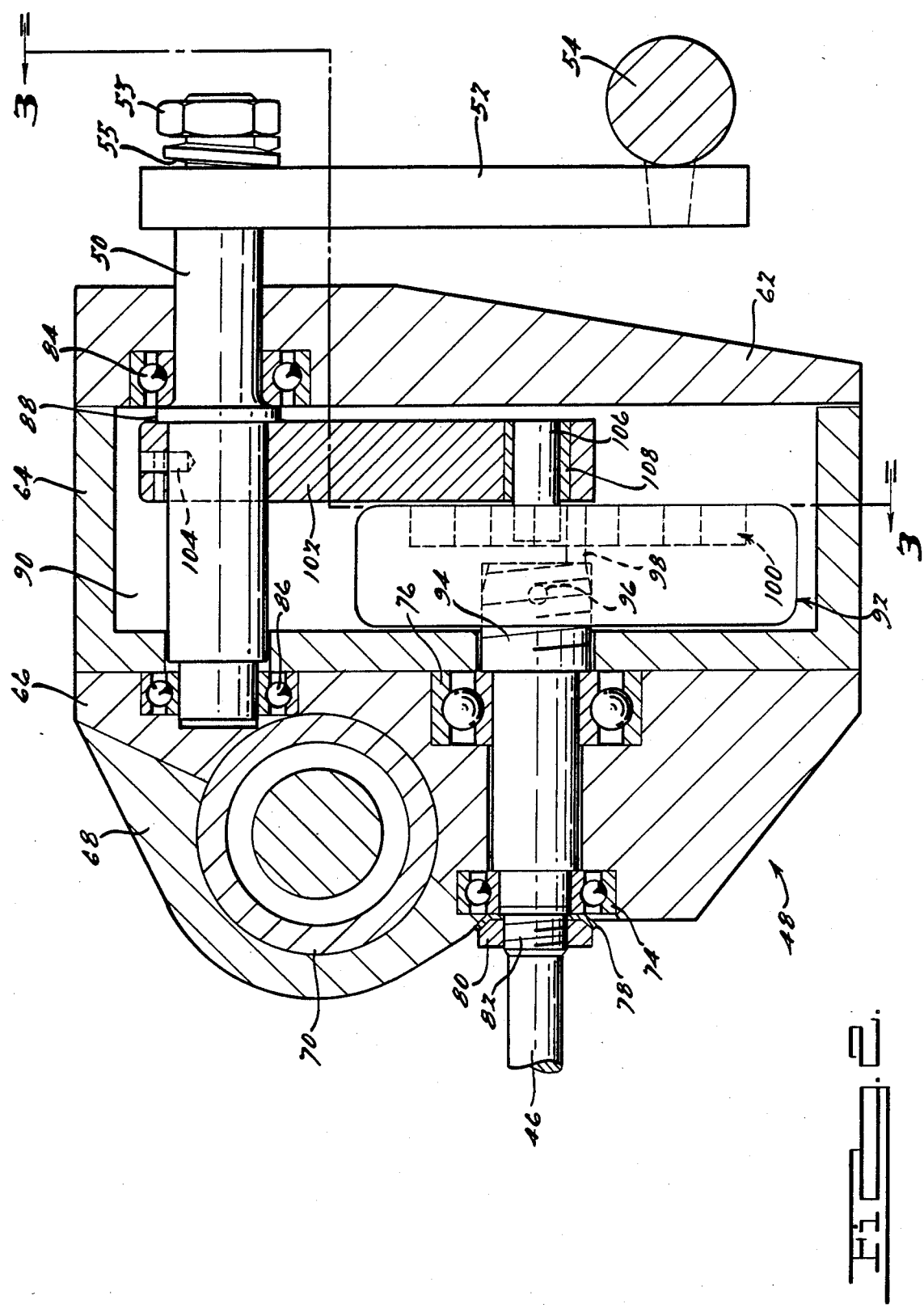
FIG. 2 is a longitudinal sectional view of the rear wheel steering drive mechanism taken substantially along the line 2—2 of FIG. 1 looking in the direction of the arrows and forming one embodiment of the present invention.
Figure 3:
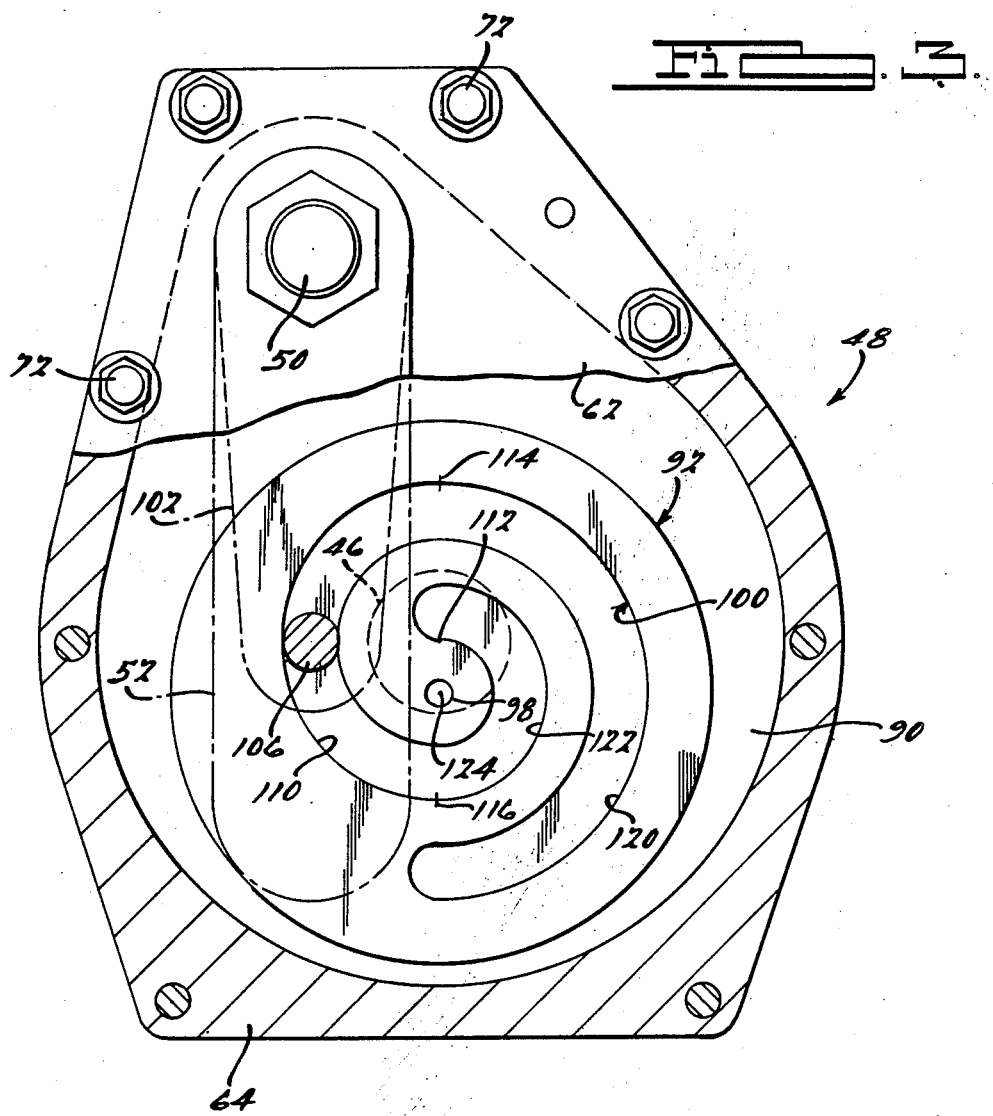
FIG. 3 is a sectional view of the rear wheel steering drive mechanism taken substantially along the line 3—3 of FIG. 2 looking in the direction of the arrows.

Referring to FIGS. 2 and 3, the rear wheel steering drive mechanism 48 includes a casing comprised of a rear housing plate 62, intermediate housing structure 64, front housing structure 66, and clamp 68. The casing elements are secured together and clamped onto axle tube 70 of the rear axle structure by means of threaded fasteners 72, as illustrated in FIG. 3.

The input shaft 46 is suitable journaled within the casing by means of bearing structures 74, 76. A washer 78 is received on the input shaft and a nut 80 is threadingly received on threaded portion 82 of the input shaft to maintain the input shaft in place. The output shaft 50 is suitably journaled within the casing by means of bearing structures 84, 86. The output shaft is mounted prior to assembly of the casing and is held against removal by means of enlarged portion 88 located within the central cavity 90 of the casing.

A cam member 92 in the form of a generally circular cam disk is positioned within the cavity 90 and is threadingly received on the inner threaded end 94 of the input shaft 46. The cam member 92 is maintained in place by means of a set screw 96. The input shaft 46 carries a pin 98 on the rearward end thereof. The pin 98 is received within an opening provided in the cam member 92 and functions to cause the cam member 92 to rotate along with the input shaft 46. This provides a positive drive not obtainable by use of the threaded connection of the cam member to the input shaft alone.

As will be noted in FIGS. 3-7, the cam member 92 has a spiral cam groove 100 in the rear face thereof. A cam arm 102 is connected to the output shaft 50 for rotation therewith by means of a pin 104. A cam pin 106 extends from the cam arm 102 into the cam groove 100. The cam pin 106 is suitably journaled by means of a bushing 108.

Referring to FIG. 3, it will be noted that the cam groove 100 has a central circular first cam portion 110, the center 112 of which is coincident with the axis of rotation of the cam member 92. In the structure illustrated, the center 112 also coincides with the axis of rotation of the input shaft 46. The cam pin 106 is positioned at substantially the mid-point of the first cam portion 110 when the vehicle front wheel steering system is in the straight ahead mode, this being illustrated in FIG. 3. The first cam portion extends over an arc of about 180 circular degrees, the ends of the first cam portion being indicated at 114, 116. As will be appreciated, the first cam portion 110 is ineffective to cause movement of the cam arm 102 so long as the cam pin 106 is positioned therewithin. The first cam portion, being circular, will merely ride around the cam pin 106. Thus, initial actuation of the front wheel steering system 20 does not cause rear wheel steering to take place. Referring to FIG. 1, the line 118 represents the degree of front wheel steering which will take place before rear wheel steering begins. In a preferred embodiment of the invention, rear wheel steering does not take place until the front wheels have been turned about 15 degrees in either direction.

The cam groove 100 has a second cam portion 120 which spirals radially outwardly from one end 114 of the first cam portion 110. A third cam portion 122 is provided. The third cam portion 122 spirals radially inwardly from the other end 116 of the first cam portion 110. Preferably, the second cam portion 120 and third cam portion 122 are circular and have a common center differing in location from that of the first cam portion 110. The common center, in the present case, is illustrated at 124 which also happens to be the center of the pin 98. Each of the second and third cam portions 120, 122 preferably extend over an arc of about 180 circular degrees.

Figure 4:
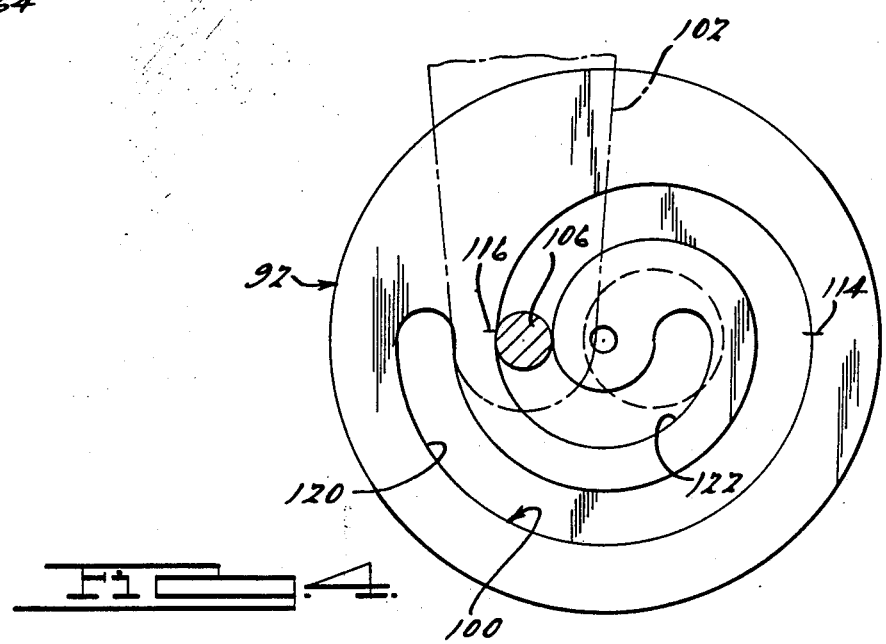
FIG. 4 is a view of the cam structure of FIG. 3 illustrating the cam pin in its initial position for actuating the rear wheel steering drive mechanism in one direction.

Continued actuation of the front wheel steering system ultimately rotates the input shaft 46 and cam member 92 to a position where the cam pin 106 enters one of the second or third cam portions 120, 122, as illustrated in FIGS. 4 and 6, depending upon the direction of front wheel steering. As the cam pin 106 progresses into cam portions 120 or 122, as illustrated in FIGS. 5 and 7, the cam arm 102 will pivot and cause rotation of the output shaft 50. The output shaft 50 will cause movement of the pitman arm 52 and thus actuate the rear wheel steering system 22. This results from the fact that the cam portions 120, 122 are formed on a different center than the first cam portion 110. These cam portions move, respectively, outwardly and inwardly of the cam member 92. Rear wheel steering takes place between 15 and 35 degrees of front wheel steering, the 35 degree point being indicated by the line 126 in FIG. 1. The maximum extent of rear wheel steering in the present embodiment is about 10 degrees as illustrated by the line 128 in FIG. 1. As will be appreciated, the lines 126, 128 illustrate steering to the left as viewed in FIG. 1. The lines would assume an opposite direction if the steering took place to the right.

As will be appreciated, when the front wheel steering system 20 is returned to straight ahead driving, the reverse process will occur and the rear wheels will assume a straight ahead position.

I claim:

1. A rear wheel steering drive mechanism for a vehicle having a front wheel steering system and a rear wheel steering system, the rear wheel steering drive mechanism comprising a casing, an input shaft and an output shaft journaled in the casing, the input shaft adapted to be operatively connected to the front wheel steering system for rotation thereby whenever the front wheel steering system is activated, the output shaft adapted to be operatively connected to the rear wheel steering system to selectively transmit front wheel steering system activity to the rear wheel steering system, a cam member positioned within the casing and connected to the input shaft for rotation therewith, the cam member having a spiral cam groove, a cam arm connected to the output shaft for rotation therewith, a cam pin extending from the cam arm into the cam groove, the cam groove having a central circular first cam portion the center of which is coincident with the axis of rotation of the cam member, the cam pin being positioned at substantially the midpoint of the first cam portion when the vehicle front wheel steering system is in the straight ahead mode whereby initial actuation of the front wheel steering system with concomitant turning of the input shaft and cam member is ineffective to cause movement of the cam arm so long as the cam pin is positioned within the first cam portion, the cam groove having a second cam portion spiralling radially outwardly from one end of the first cam portion and a third cam portion spiralling radially inwardly from the other end of the first cam portion, said second and third cam portions being circular and having a common center differing in location from that of the first cam portion, continued actuation of the front wheel steering system ultimately rotating the input shaft and cam member to a position where the cam pin enters one of the second or third cam portions depending upon the direction of front wheel steering with resultant pivoting of the cam arm and rotation of the output shaft and actuation of the rear wheel steering system.

2. A rear wheel steering drive mechanism as defined in claim 1, further characterized in that the first cam portion extends over an arc of about 180 circular degrees.

3. A rear wheel steering drive mechanism as defined in claim 2, further characterized in that each of the second and third cam portions extends over an arc of about 180 circular degrees.

4. A rear wheel steering drive mechanism as defined in claim 1, further characterized in that the drive mechanism initiates rear wheel steering after the front wheel steering mechanism has progressed about 15 circular degrees in either direction.

5. A rear wheel steering drive mechanism as defined in claim 4, further characterized in that the drive mechanism actuates the rear wheel steering mechanism about 10 circular degrees in either direction.

* * * * *